United States Patent [19]

Cagliostro et al.

[11] 4,385,043

[45] May 24, 1983

[54] METHOD OF CARBONIZING POLYACRYLONITRILE FIBERS

[75] Inventors: Domenick E. Cagliostro, Berkeley; Narcinda R. Lerner, Woodside, both of Calif.

[73] Assignee: The United States of America as represented by the Administrator of the National Aeronautics and Space Administration, Washington, D.C.

[21] Appl. No.: 282,129

[22] Filed: Jul. 10, 1981

[51] Int. Cl.³ .............................................. D01F 9/22
[52] U.S. Cl. ............................ 423/447.6; 423/447.2; 423/447.7
[58] Field of Search ............... 423/447.1, 447.2, 447.4, 423/447.6, 447.7; 264/29.2; 8/115.5

[56] References Cited

U.S. PATENT DOCUMENTS

| | | | |
|---|---|---|---|
| 3,412,062 | 11/1968 | Johnson et al. | 423/447.6 |
| 3,552,923 | 1/1971 | Carpenter et al. | 423/447.6 |
| 3,767,773 | 10/1973 | Turner et al. | 423/447.4 |
| 4,100,004 | 7/1978 | Moss et al. | 423/447.2 |
| 4,295,844 | 10/1981 | Warner | 423/447.4 |

*Primary Examiner*—Edward J. Meros
*Attorney, Agent, or Firm*—Darrell G. Brekke; John R. Manning; Robert D. Marchant

[57] ABSTRACT

This invention relates to a method of carbonizing polyacrylonitrile fibers (PAN fibers) by exposing the fibers at an elevated temperature to an oxidizing atmosphere, then exposing the oxidized fibers to an atmosphere of an inert gas such as nitrogen containing a carbonaceous material such as acetylene. The fibers are preferably treated with an organic compound, for example benzoic acid, before the exposure to an oxidizing atmosphere. The invention also relates to the resulting fibers. The treated fibers have enhanced tensile strength.

5 Claims, No Drawings

METHOD OF CARBONIZING POLYACRYLONITRILE FIBERS

ORIGIN OF THE INVENTION

The invention described herein was made by an employee of the United States Government and may be manufactured and used by or for the Government for governmental purposes without the payment of any royalties thereon or therefor.

This invention relates to the carbonization of polyacrylonitrile (PAN) fibers.

BACKGROUND ART

Carbonized PAN fibers find use as reinforcement in various materials of construction, principally plastic materials. It is desirable that the fibers have a high tensile strength and for certain purposes that they also have a high electrical resistance.

Such fibers intended as reinforcement are oxidized by air at a relatively low temperature, typically about 260° C., and are then subjected to carbonization in an inert atmosphere at an elevated temperature. The carbonization is typically carried out in an atmosphere of nitrogen and it may be carried out at a relatively low temperature, for example 1200° to 1500° C. or at a higher temperature, for example about 2500° to 3000° C. The carbonized fibers resulting from the lower temperature carbonization have higher tensile strength than those prepared at the high temperature.

OBJECT OF THE INVENTION

It is an object of the present invention to improve upon the methods of producing carbonized PAN fibers and to produce PAN fibers of higher tensile strength, and higher modulus than heretofore and/or of higher electrical resistance.

SUMMARY OF THE INVENTION

In accordance with the invention PAN fibers, after the oxidation step described above, are carbonized, preferably at an even lower temperature than indicated above, in the presence of a gaseous active carbon substance, such as, for example, acetylene and/or others mentioned hereinbelow. As will be apparent from the examples and data presented hereinbelow, tensile strength is greatly improved. Preferably, prior to the oxidation step, the PAN fibers are subjected to contact at a relatively low temperature, typically at about 140° to 200° C., with molten benzoic acid or other similar liquid or gaseous conditioning material.

DETAILED DESCRIPTION OF THE INVENTION

As active carbon sources any one or a mixture of the following may be used: Methane, acetylene, ethylene, fuel gas and aliphatic hydrocarbons generally, provided they can be used in gaseous form; benzene and other aromatic hydrocarbons; also nonhydrocarbon organic materials such as carbon disulfide. In general any carbonaceous material that is gaseous at the temperature involved and which decomposes at temperatures below 1000° C. within a reasonable period of time, of the order of minutes, may be used for this purpose provided it does not react destructively with the PAN fibers.

In place of benzoic acid other aromatic carboxylic acids may be used such as phthalic acid, terephthalic acid and naphthoic acid. Hydroquinone may also be used. They may be used in liquid, e.g. molten state or in the gaseous state.

The examples below will serve further to illustrate the practice and advantages of the invention. In carrying out the experimental work, a standard procedure and a modified procedure were employed as follows:

STANDARD PROCEDURE

A tow of 96 filaments of 2.3 denier PAN was oxidized at 260° C. over a contact time of about 3 hours under a load of 15 g in a tubular reactor of about 2.45 cm diameter to produce a fiber with less than 5% shrinkage or extension. The sample was then heated at a rate of 20° C./min to temperatures within a range of 450°–1100° C. in a flow of 20 cc/min nitrogen atmosphere under a load of about 50 g in a tubular reactor of about 1.9 cm diameter.

MODIFIED PROCEDURE

In Examples 2, 4, 5 and 6 the same PAN tow was first passed through a molten benzoic acid bath at 175° with 1 g loading over a contact time of about 3 hours to produce fibers with less than 10% shrinkage or extension. In each of Examples 2 to 6 (after treatment with benzoic acid in Examples 2, 4, 5 and 6) the samples were oxidized at the control conditions under a load of 50 g to produce fibers with less than 5 percent shrinkage or extension. The oxidized fibers were then carbonized at the control conditions, except for the presence, as indicated, of a mixture of acetylene-nitrogen as the atmosphere (5.34% acetylene, 94.66% nitrogen).

The results are set forth in Table 1 below. It will be seen that substantial improvement in tensile strength resulted from carbonizing (Example 3) in an atmosphere of nitrogen and acetylene and that the best results were obtained by pre-treatment with benzoic acid followed by oxidation and carbonization in an atmosphere of nitrogen and acetylene (Example 4). Example 5 shows that treatment with benzoic acid, carbonizing in an atmosphere of nitrogen, cooling and then carbonizing in an atmosphere of nitrogen and acetylene substantially improves tensile strength but not as much as in Example 4 where the initial (and only) carbonization is carried out in an atmosphere of nitrogen and acetylene.

TABLE 1

Effect of Processes on Tensile Strength of Final Carbon Fiber Product

| Sample Treatment | Benzoic Acid, 175° C., hr | Air Oxidation at 260° C., hr | 100% $N_2$, at °C. | 5.34% $C_2H_2/N_2$ at °C. | % Elongation |
|---|---|---|---|---|---|
| 1. Oxidized and carbonized in $N_2$ (standard process) | — | 3 | 700 | — | 0.76 |
| 2. Treated with benzoic acid, oxidized and carbonized In $N_2$ | 3 | 3 | 700 | — | 0.77 |
| 3. Oxidized and carbonized in $C_2H_2$ | — | 3 | — | 700 | 0.90 |
| 4. Treated with benzoic acid, | 3 | 3 | — | 700 | 1.22 |

TABLE 1-continued
Effect of Processes on Tensile Strength of Final Carbon Fiber Product

|  |  |  |  |  |  |
|---|---|---|---|---|---|
| oxidized and carbonized In $C_2H_2$ |  |  |  |  |  |
| 5. Treated with benzoic acid, oxidized and carbonized in $N_2$, cooled and carbonized in $C_2H_2$ | 3 | 3 | 700 | 700 | — |
| 6. Treated in benzoic acid and carbonized in $C_2H_2$ | 3 | — | — | 700 | — |

| Sample Treatment | Modulus (psi × $10^{-6}$) | Resistance (Ω cm) | Tensile Strength (psi) | % Change in Tensile Strength From (A) |
|---|---|---|---|---|
| 1. Oxidized and carbonized in $N_2$ (standard process) | 11.9 | 4.18 | 90596 | 0.00 |
| 2. Treated with benzoic acid, oxidized and carbonized In $N_2$ | 12.4 | 9.10 | 95160 | +5.04 |
| 3. Oxidized and carbonized in $C_2H_2$ | 13.8 | 1.32 | 124400 | +37.30 |
| 4. Treated with benzoic acid, oxidized and carbonized In $C_2H_2$ | 12.6 | 3.18 | 154170 | +70.20 |
| 5. Treated with benzoic acid, oxidized and carbonized in $N_2$, cooled and carbonized in $C_2H_2$ | — | — | 129980 | +43.50 |
| 6. Treated in benzoic acid and carbonized in $C_2H_2$ | — | — | 103100 | +13.70 |

Note: Figures in Columns 1 and 2 are approximate.

In Table II the effects of acetylene concentration and temperature on tensile strength are set forth. The modified procedure was used in all cases.

TABLE II
Effect of Acetylene Concentration and Temperature on Tensile Strength during Carbonization of a PAN Sample Treated in Benzoic Acid at 175° C. for 3 hr and Air-Oxidized at 260° C. for 3 hr.

| Sample | Acetylene Concentration, % | Temperature, °C. | Tensile Strength, (psi) | Resistance, ohm-cm | % Elongation | Modulus (psi × $10^{-6}$) |
|---|---|---|---|---|---|---|
| 1 | 5.34 | 647 | 122,730 | 44.1 | n.a. | n.a. |
| 2 | 5.34 | 705 | 154,170 | 3.18 | 1.22 | 12.6 |
| 3 | 5.34 | 800 | 191,180 | .058 | 0.74 | 25.8 |
| 4 | 5.34 | 845 | 169,550 | .019 | 0.70 | 24.2 |
| 1 | 11.3 | 610 | 73,590 | 254.7 | — | — |
| 2 | 11.3 | 705 | 124,450 | 1.54 | — | — |
| 3 | 11.3 | 750 | 136,320 | .212 | — | — |
| 4 | 11.3 | 805 | 116,860 | .054 | — | — |
| 1 | 14.02 | 500 | 68,370 | 18300 | — | — |
| 2 | 14.02 | 590 | 116,930 | 657.6 | — | — |
| 3 | 14.02 | 655 | 144,900 | 9.52 | — | — |
| 4 | 14.02 | 703 | 133,280 | n.a. | — | — |
| Standard process | 0.00 | 705 | 90,590 | 4.18 | 0.76 | 11.9 | the gas flow decreased to 0.5–1.0 cc/min during the 5-minute hold period, and the system purged with 90 cc/min pure $N_2$ on cooldown.

TABLE III
The Effect of Variation of Carbonization Procedure on Tensile Strength

| Procedure | Temperature, °C. | Acetylene Concentration, % | Tensile Strength, psi | Resistance ohm-cm | % Elongation | Modulus (psi × $10^{-6}$) |
|---|---|---|---|---|---|---|
| 1. Straight heat-up at 20° C./min in $C_2H_2$ | 845 | 5.34 | 171,500 | 0.0191 | 0.71 | 24.2 |
| 2. Modified | 840 | 5.34 | 235,200 | .0199 | 0.93 | 25.3 |
| 3. " |  | 2.0 | 256,433 | — | 1.01 | 25.4 |
| 4. " |  | 1.0 | 225,400 | — | 1.00 | 22.5 |
| 5. " |  | 0.0 | 104,920 | — | 0.61 | 17.2 |

Table III illustrates the effect of varying the procedure. In the first case there was a straight heating in an atmosphere of acetylene and nitrogen. In the other cases the fiber was heated to 500° C. in 20 cc/min flow of pure $N_2$, held for 10 minutes while the acetylene mixture replaced the $N_2$, heated to the set temperature,

What is claimed is:

1. A method of treating polyacrylonitrile fibers to enhance their tensile strengths which comprises the following steps:

(a) subjecting the fibers to oxidation by exposure to molecular oxygen at a temperature of about 220° to 350° C. for a period of time not exceeding about 3 hours, (b) then exposing the thus treated fibers to a carbonizing temperature not greater than about 1100° C. in a non-oxidizing atmosphere containing an added gaseous active carbon component in sufficient amount to enhance the tensile strength of the carbonized fiber as compared to the same fibers carbonized similarly in an inert atmosphere, said active carbon compound being one which undergoes decomposition at a substantial rate below 1000° C.

2. The method of claim 1 wherein step (a) is preceded by treatment of the fibers at a temperature not exceeding about 190° C. with a liquid or gaseous organic compound capable of enhancing the effect of the active carbon component on tensile strength.

3. The method of claim 2 wherein the organic compound is molten benzoic acid.

4. The method of claim 3 wherein the active carbon component is a hydrocarbon.

5. The method of claim 4 wherein the atmosphere used in step (b) is a gaseous mixture of inert gas and such active carbon component.

* * * * *